(12) United States Patent
Sheth et al.

(10) Patent No.: US 8,787,148 B2
(45) Date of Patent: *Jul. 22, 2014

(54) METHODS AND SYSTEMS TO COMMUNICATE MEDIA DATA ACROSS DIFFERENT NETWORKS

(75) Inventors: Niral Sheth, Austin, TX (US); Bernard Ku, Austin, TX (US); Arshad Khan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 248 days.

This patent is subject to a terminal disclaimer.

(21) Appl. No.: 13/361,043

(22) Filed: Jan. 30, 2012

(65) Prior Publication Data

US 2012/0127989 A1 May 24, 2012

Related U.S. Application Data

(63) Continuation of application No. 11/672,401, filed on Feb. 7, 2007, now Pat. No. 8,125,899.

(51) Int. Cl.
*G01R 31/08* (2006.01)
(52) U.S. Cl.
USPC .......................................... 370/216; 370/401
(58) Field of Classification Search
USPC ......... 370/216–220, 228, 230–238, 252–253, 370/401–427
See application file for complete search history.

(56) References Cited

U.S. PATENT DOCUMENTS

| 6,292,832 | B1 | 9/2001 | Shah et al. | |
|---|---|---|---|---|
| 6,452,921 | B1 * | 9/2002 | Alexander et al. | 370/351 |
| 6,578,087 | B1 | 6/2003 | Garakani et al. | |
| 6,829,221 | B1 | 12/2004 | Winckles et al. | |
| 6,882,653 | B1 | 4/2005 | Kiuchi et al. | |
| 7,139,263 | B2 | 11/2006 | Miller et al. | |
| 2002/0112087 | A1 | 8/2002 | Berg | |
| 2005/0144326 | A1 | 6/2005 | Sugar et al. | |
| 2006/0188080 | A1 * | 8/2006 | Terpstra et al. | 379/211.02 |
| 2007/0019619 | A1 | 1/2007 | Foster et al. | |
| 2007/0091898 | A1 | 4/2007 | Rengaraju et al. | |
| 2007/0211716 | A1 | 9/2007 | Oz et al. | |

OTHER PUBLICATIONS

Ericsson, Network Working Group, 3455, Jan. 2003.*
Patent Cooperation Treaty, "Written Opinion of the International Searching Authority," issued by the International Searching Authority in connection with counterpart PCT application No. PCT/US2008/051172, mailed Jul. 23, 2008, 5 pages.

(Continued)

*Primary Examiner* — Ricky Ngo
*Assistant Examiner* — Iqbal Zaidi
(74) *Attorney, Agent, or Firm* — Hanley, Flight & Zimmerman, LLC

(57) ABSTRACT

Example methods and apparatus to communicate media across different networks are disclosed. A disclosed example method involves determining, with a processor, whether a second network device in a second network has a capability associated with a first descriptor in a first data packet from a first network device in a first network, communicating, with the processor, a second descriptor indicative of whether the second network device has the capability to the first network device via a second data packet, and when the second network device has the capability, receiving, via the second network device, data from a communication source that bypasses the first network device and communicates the data to the second network device.

19 Claims, 7 Drawing Sheets

(56) References Cited

OTHER PUBLICATIONS

Patent Cooperation Treaty, "Written Opinion of the International Searching Authority," issued by the International Searching Authority in connection with counterpart PCT application No. PCT/US2008/051172, mailed Jul. 23, 2008, 10 pages.
Rosenberg, J.; Sipping WG, Dynamicsoft, "Supporting Intermediary Session Policies in SIP; draft-rosenberg-sipping-session-policy-00.txt," IETF Standard-Working-Draft, Internet Engineering Task Force, IETF, CH, May 2, 2002, 31 pages.
Rosenberg, J.; Cisco Systems, "Interactive Connectivity Establishment (ICE): A Methodology for Network Address Translator (NAT) Traversal for Offer/Answer Protocols; draft-ietf-mmusic-ice-13.txt," IETF Standard-Working-Draft, Internet Engineering Task Force, IETF, CH, vol. mmusic, No. 13, Jan. 16, 2007, 81 pages.
Hautakorpi, J. et al., "Requirements from SIP (Session Initiation Protocol) Session Border Control Deployments; draft-ietf-sipping-sbc-funcs-00,txt," IETF Standard-Working-Draft, Internet Engineering Task Force, IETF, CH, vol. sipping, Nov. 24, 2006, 24 pages.
Aoun, C; Sen, S.; Nortel Networks, "Identifying Intra-Realm Calls and Avoiding Media Tromboning; draft-aoun-midcom-intrarealmcalls-00.txt," IETF Standard-Working-Draft, Internet Engineering Task Force, IETF, CH, Feb. 25, 2002, 9 pages.
International Bureau, "International Preliminary Report on Patentability," issued in connection with PCT application Serial No. PCT/US2008/051172, mailed Aug. 20, 2009 (9 pages).
Cumming, Jonathan; "Session Border Control in IMS," Data Connection Limited, Sep. 2005 (33 pages).
Zhou et al., "Distributed Architecture of VOIP for Firewall/NAT Traversing," www.ieee.com, Sep. 2005 (5 pages).
Garcia-Martin et al., "Private HEader (P-Header) Extensions to the Session Initiation Protocol (SIP) for the 3rd-Generation Partnership Project (3GPP)," Network Working Group, RFC 3455, Jan. 2003 (35 pages).
Nortel Networks, "Eliminating Boundaries," www.nortelnetworks.com, 2004 (10 pages).
Lougheed et al., "A Border Gateway Protocol (BGP)," Network Working Group, RFC 1105, Jun. 1989 (17 pages).
Internetworking Technologies Handbook, Chapter 39: Border Gateway Protocol (pp. 39-1 to 39-10).
Sen et al., "Midcom-Unaware NAT/Firewall Traversal," Internet Draft, Midcom Working Group, Apr. 2002 (10 pages).
Sen et al., "Midcom-Unaware NAT/Firewall Traversal," Internet Draft, Midcom Working Group, Sep. 2001 (8 pages).
United States Patent and Trademark Office, Office Action issued in U.S. Appl. No. 11/672,401, dated Jun. 8, 2009, 23 pages.
United States Patent and Trademark Office, Office Action issued in U.S. Appl. No. 11/672,401, dated Feb. 5, 2010, 29 pages.
United States Patent and Trademark Office, Office Action issued in U.S. Appl. No. 11/672,401, dated Mar. 30, 2011, 28 pages.
United States Patent and Trademark Office, Notice of Allowance issued in U.S. Appl. No. 11/672,401, dated Nov. 4, 2011, 28 pages.

* cited by examiner

METHODS AND SYSTEMS TO COMMUNICATE MEDIA DATA ACROSS DIFFERENT NETWORKS

PRIORITY APPLICATIONS

This patent is a continuation of U.S. patent application Ser. No. 11/672,401, filed Feb. 7, 2007, which is hereby incorporated herein by reference in its entirety.

FIELD OF THE DISCLOSURE

The present disclosure relates generally to communication systems and, more particularly, to methods and systems to communicate media data across different networks.

BACKGROUND

Networks or network segments are often separated by network border control devices including session border controllers (S/BC). Network border control devices such as S/BC's are configured to control and secure delivery of control signaling and media information across separate networks or separate network segments. In some cases, a network service provider may use S/BC's to separate various network segments or two or more network service providers may use S/BC's to separate respective network segments. In such configurations, media communicated across two network segments has to traverse both an originating S/BC corresponding to an originating network or network segment and a terminating S/BC corresponding to another network or network segment. This is known as media anchoring because the media data must be communicated through (e.g., anchored through) the originating S/BC before being communicated to the terminating S/BC. Voice over Internet protocol (VoIP) communications are often subject to media anchoring.

DETAILED DESCRIPTION

The example methods and systems described herein may be used to communicate media data across different networks. In particular, the example methods and systems enable releasing media data across different networks associated with internet protocol-based communications such as, for example, VoIP calls across different networks having respective session border controllers (S/BC's). An example method that can be used to release media data from a source (e.g., a VoIP device) across different networks involves receiving a call request from the source at an originating S/BC of an originating network and using information in a header provided by the originating S/BC to determine whether the media data should be routed through the originating S/BC and through a terminating S/BC of another network, or whether the source can bypass the originating S/BC and communicate the media data directly to the terminating S/BC.

In an example implementation, when the originating S/BC receives a call request initiated by a VoIP device (e.g., a source), the originating S/BC generates a P-Access-Network-Information header that is defined in Internet Engineering Task Force (IETF) Request for Comments (RFC) 3455 and that includes an access-type field that can store a descriptor value of 'private' or a descriptor value of 'public.' Access type indicates the type of access associated with the VoIP call as indicated by the VoIP device. A public access call can be routed through the public Internet, while a private call must be routed through a private communication path (e.g., a private network, a private enterprise network, a private corporate network, etc.) to ensure, for example, data security. The originating S/BC then forwards the P-Access-Network-Information header including the access-type value (e.g., public or private) to a terminating S/BC of another network. The terminating S/BC then checks the access-type field. If the access type is public and the terminating S/BC is able to connect to a public network (e.g., the public Internet), the terminating S/BC returns its public IP address and a value of public in an access-info field. On the other hand, if the access type is private, the terminating S/BC returns its private IP address and a value of private in the access-info field. The access-info field is communicated to the originating S/BC, and the originating S/BC analyzes the access-info value in view of the access-type value. If the access-type value is public and the access-info value is also public, or if the access-type value is private and the access-info value is also private, the originating S/BC releases the media information so that the media information can be communicated directly through the terminating S/BC without requiring the media information to pass through the intervening originating S/BC.

Figure 1:
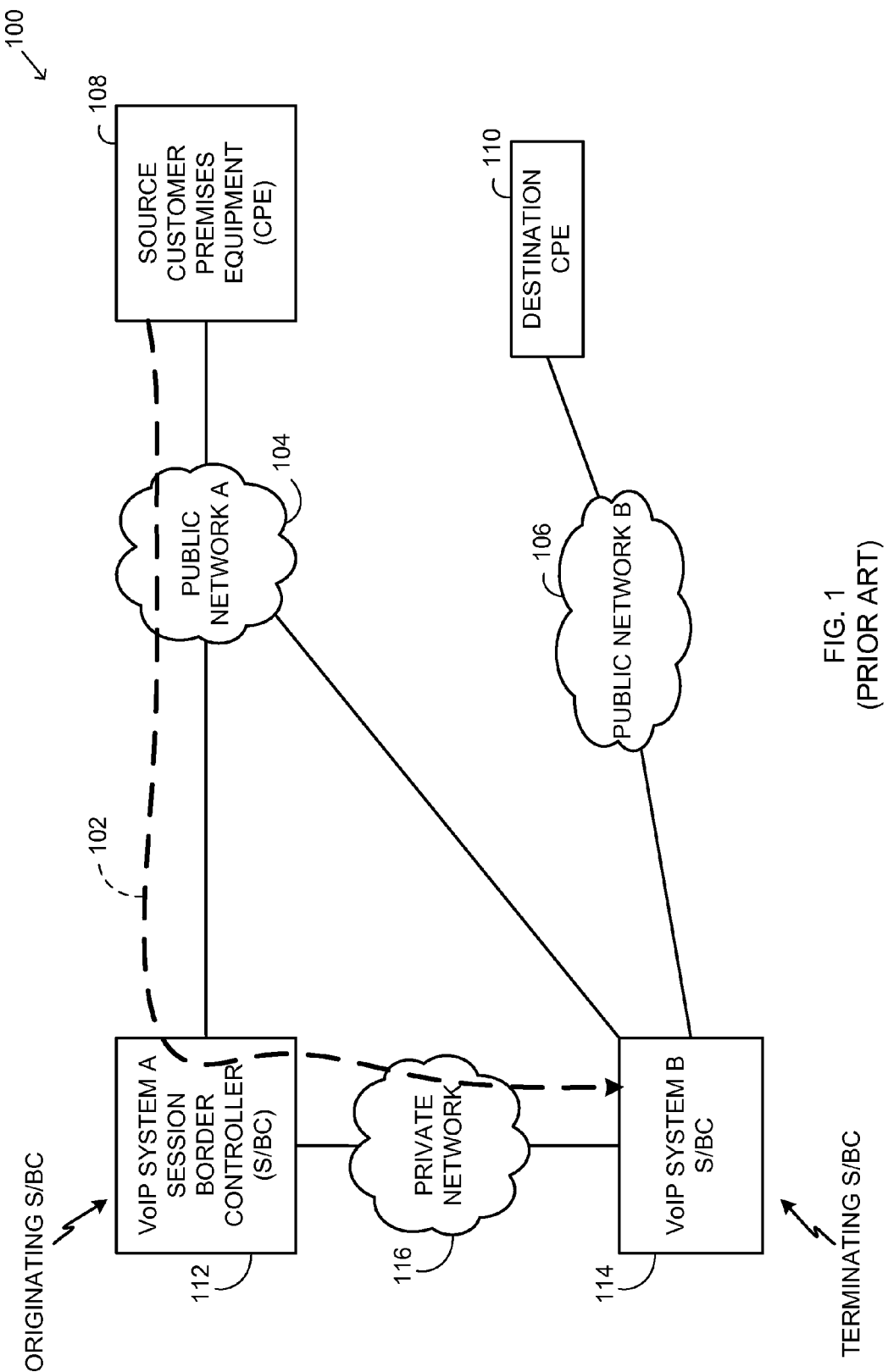
FIG. 1 is an example network system configured to use a known media anchoring technique for communicating media data across different networks.

FIG. 1 is an example network system 100 configured to use a known media anchoring technique for communicating media data 102 (e.g., VoIP media data) across different networks 104 and 106. The media data 102 may include audio data, video data, voice data, text data, and/or graphics data. In the illustrated example, the network 104 is a first public network A and the network 106 is a second public network B. The example network system 100 is described in connection with an example source device 108 (e.g., a VoIP device) communicatively coupled to the public network A 104 and configured to place a VoIP call to an example destination device 110 (e.g., a VoIP device) communicatively coupled to the public network B 106.

As shown, the public network A 104 is provided with a VoIP system A S/BC 112 to control the communication of data (e.g., the media data 102) to and from the public network A 104. In addition, the public network B 106 is provided with a VoIP system B S/BC 114 to control the communication of data to and from the public network B 106. In the illustrated example, the S/BC's 112 and 114 are also communicatively coupled to a private network 116.

When the source 108 places a call to the destination 110 as shown in the example of FIG. 1, the S/BC A 112 is an originating S/BC 112 and the S/BC B 114 is a terminating S/BC 114. Known techniques for communicating media data such as VoIP data between the source 108 and the destination 110 require anchoring the media data at the originating S/BC 112 so that any media data communicated from the source 104 to the destination 106 must be routed through the originating S/BC 112 and the terminating S/BC 114. Such media anchoring is used to preserve the security of the call. However, anchoring the media data 102 as shown in FIG. 1 has several drawbacks that include, for example, reducing a quality of service. For example, anchoring media often leads to inefficient use of bandwidth and resources of the originating and terminating S/BC's 112 and 114. In addition, anchoring media can add substantial delay to a call, which, in turn, affects the user experience and customer satisfaction associated with VoIP services.

Figure 2:
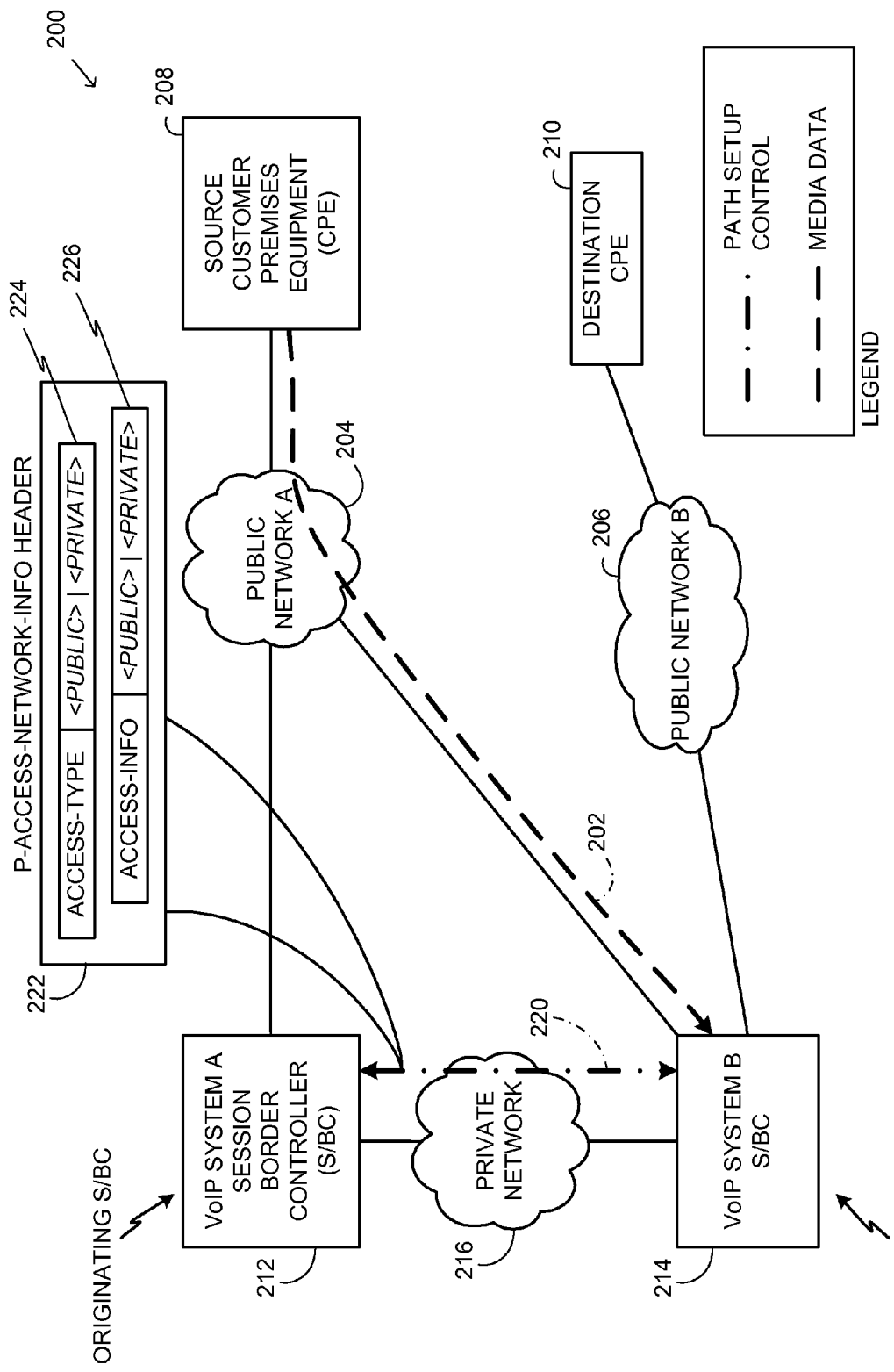
FIG. 2 is an example network system configured to use the example methods and apparatus described herein to release media across different networks.

FIG. 2 is an example network system 200 configured to use the example methods and systems described herein to release media data 202 across different networks 204 and 206. The media data 202 may include audio data, video data, voice data, text data, and/or graphics data. In the illustrated example, the network 204 is a first public network A and the network 206 is a second public network B. For purposes of discussion, the example network system 200 is described in connection with an example source device 208 (e.g., a VoIP device) communicatively coupled to the public network A 204 and configured to place a VoIP call to an example destination device 210 (e.g., a VoIP device) communicatively coupled to the public network B 206.

As shown, the public network A 204 is provided with an originating S/BC 212 to control the communication of data (e.g., the media data 202) to and from the public network A 204. In addition, the public network B 206 is provided with a terminating S/BC 214 to control the communication of data to and from the public network B 206. In the illustrated example, the S/BC's 212 and 214 are also communicatively coupled to each other via a private network 216. In the illustrated example, the S/BC's 212 and 214 use the private network 216 to communicate control data 220 (e.g., a P-Access-Network-Info header 222) and to establish private communication paths between each other. The S/BC's 212 and 214 can be implemented using the example S/BC 300 described below in connection with FIG. 3 and/or the example systems 400a and 400b described below in connection with FIG. 5.

In the illustrated example of FIG. 2, the S/BC's 212 and 214 are configured to communicate the control data 220 to one another to release the media data 202 so that the source 208 can bypass the originating S/BC 212 to communicate the media data 202 directly to the terminating S/BC 214. Specifically, the S/BC's 212 and 214 are configured to use a P-Access-Network-Info header 222 defined in IETF RFC 3455 to exchange parameter values and use the parameter values to determine whether to release the media data 202. As shown in the illustrated example of FIG. 2, the P-Access-Network-Info header 222 includes an access-type field 224 and an access-info field 226. When the originating S/BC 212 receives a call request from the source 208, the originating S/BC 212 generates the P-Access-Network-Info header 222 and writes a descriptor including a value of "public" or a value of "private" in the access-type field 224. For example, the source 208 may require a private communication path when trying to communicate via, for example, a virtual private network, a trusted network, a secure network, etc. If the call request from the source 208 indicates that the source 208 requires a private communication path, the originating S/BC 212 writes "private" into the access-type field 224. Otherwise, if the originating S/BC 212 determines that the call request indicates a public communication path, the originating S/BC 212 writes "public" into the access-type field. 224.

The originating S/BC 212 then communicates the P-Access-Network-Info header 222 to the terminating S/BC 214, and the terminating S/BC 214 determines whether the access-type field 224 includes a public descriptor or a private descriptor. If the access-type field 224 includes the public descriptor and the terminating S/BC 214 has access to a public network (e.g., the public network A 204), the terminating S/BC 214 writes a public descriptor in the access-info field 226 of the P-Access-Network-Info header 222. The terminating S/BC 214 then communicates the P-Access-Network-Info header 222 and its public IP address to the originating S/BC 212. The public IP address is an IP address that was allocated by a network administrator to the terminating S/BC 214 for use by the terminating S/BC 214 to communicate (e.g., receive and transmit) data via a public network such as, for example, the public network A 204 of FIG. 2. However, if the terminating S/BC 214 does not have access to a public network (e.g., the public network A 204), the terminating S/BC 214 writes a private descriptor in the access-info field 226 and communicates the P-Access-Network-Info header 222 to the originating S/BC 212 without its public IP address. On the other hand, if the terminating S/BC 214 determines that the access-type field 224 received from the originating S/BC 212 includes the private descriptor, the terminating S/BC 214 writes a private descriptor in the access-info field 226 of the P-Access-Network-Info header 222 indicating that it can communicate via a private communication path (e.g., the private network 216). The terminating S/BC 214 then communicates the P-Access-Network-Info header 222 and its private IP address to the originating S/BC 212. The private IP address is an IP address that was allocated by a network administrator to the terminating S/BC 214 for use by the terminating S/BC 214 to communicate (e.g., receive and transmit) data via a private communication path (e.g., the private network 216).

When the originating S/BC 212 receives the P-Access-Network-Info header 222, the originating S/BC 212 reads the access-info field 226 to determine whether the descriptor stored in the access-type field 224 matches the descriptor stored in the access-info field 226. If the descriptors match, the originating S/BC 212 communicates the IP address (e.g., a public IP address or a private IP address) provided by the terminating S/BC 214 to the source 208. In this manner, the originating S/BC 212 releases the media data 202 so that the source 208 can use the IP address of the terminating S/BC 214 to bypass the originating S/BC 212 and communicate the media data 202 directly to the terminating S/BC 214. If, on the other hand, the originating S/BC 212 determines that the descriptors of the fields 224 and 226 do not match, the originating S/BC 212 communicates its IP address to the source 208. In this manner, the originating S/BC 212 anchors the media data 202 so that the source 208 must communicate the media data 202 to the terminating S/BC 214 via the originating S/BC 212.

Figure 3:
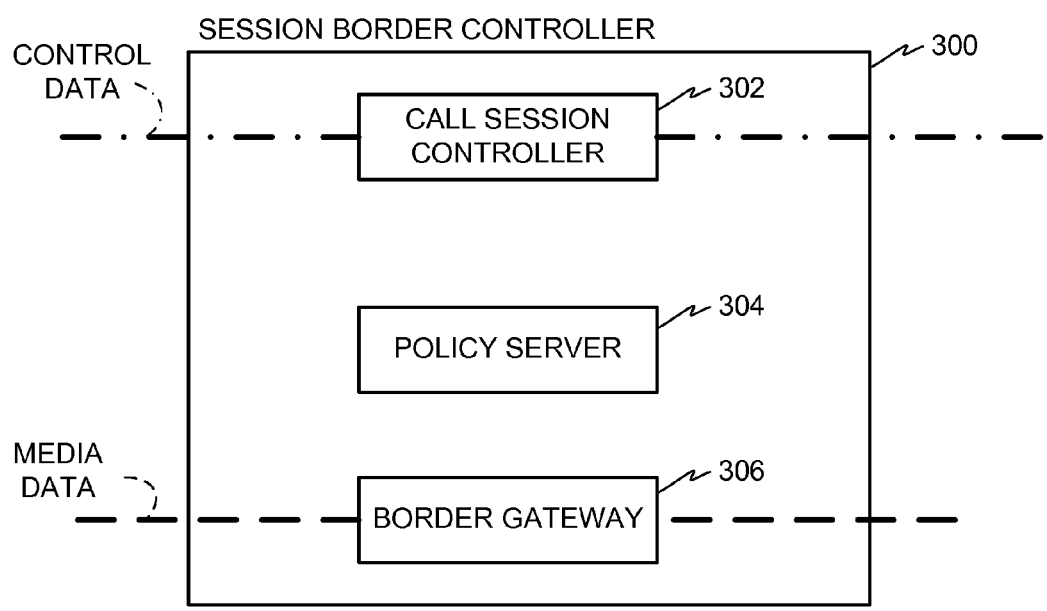
FIG. 3 is an example session border controller that may be used to implement the session border controllers of FIG. 2.

FIG. 3 is an example S/BC 300 that may be used to implement the S/BC's 212 and 214 of FIG. 2. The S/BC 300 is configured in accordance with the IP multimedia subsystem (IMS), release 7 standard defined by the 3rd Generation Partnership Project (3GPP). The example S/BC 300 includes a call session controller (CSC) 302, a policy server 304, and a border gateway 306, all of which may be implemented using any desired combination of hardware, firmware, and/or software. For example, one or more integrated circuits, discrete semiconductor components, or passive electronic components may be used. Additionally or alternatively, some or all of the blocks of the example S/BC 300, or parts thereof, may be implemented using instructions, code, and/or other software and/or firmware, etc. stored on a machine accessible medium that, when executed by, for example, a processor system (e.g., the example processor system 610 of FIG. 6), perform the operations represented in the flow diagrams of FIGS. 5A and 5B. In the illustrated example, the blocks of the example S/BC 300 can be implemented in a single network device (e.g., a single housing). Alternatively, some or all of the blocks of the example S/BC 300 can be distributed among one or more separate devices in the example network system 200 of FIG. 2.

In the illustrated example, the call session controller 302 implements a call session control function (CSCF). The CSCF determines whether a VoIP call should be established and which features or services should be used to establish the call based on the features or services subscribed to by the calling and/or called subscriber. For example, the call session controller 302 is configured to receive call requests or data path requests from other network entities including other S/BC's or call sources (e.g., the source 208 of FIG. 2). The call session controller 302 may be configured to transmit and/or receive the P-Network-Access-Info header 222 described above in connection with FIG. 2 to another S/BC to determine whether to anchor or release media data (e.g., the media data 202 of FIG. 2).

The policy server 304 implements a policy decision function (PDF), which is a service-based local policy control that determines and manages how IP resources are to be allocated for IP-based communications made via the S/BC 300. In the illustrated example, after the call session controller 302 receives a request to route IP-based traffic via the S/BC 300, the call session controller 302 may communicate with the policy server 304 to determine whether the S/BC 300 can allocate the requested resources based on rules and policies associated with the communication parameters or requirements (e.g., a private IP communication path) of the request. For example, if the S/BC 300 receives a request for a public communication path, the policy server 304 determines whether its rules or policies indicate that the S/BC 300 can communicate via a public network (e.g., the public network A 204 of FIG. 2).

The border gateway 306 is configured to manage the communication of media data (e.g., the media data 202 of FIG. 2) via the S/BC 300. For example, the border gateway 306 ensures that media data 202 is communicated in accordance with its associated parameters (e.g., private path communication, encryption, etc.) to other S/BC's or destinations.

Figure 4:
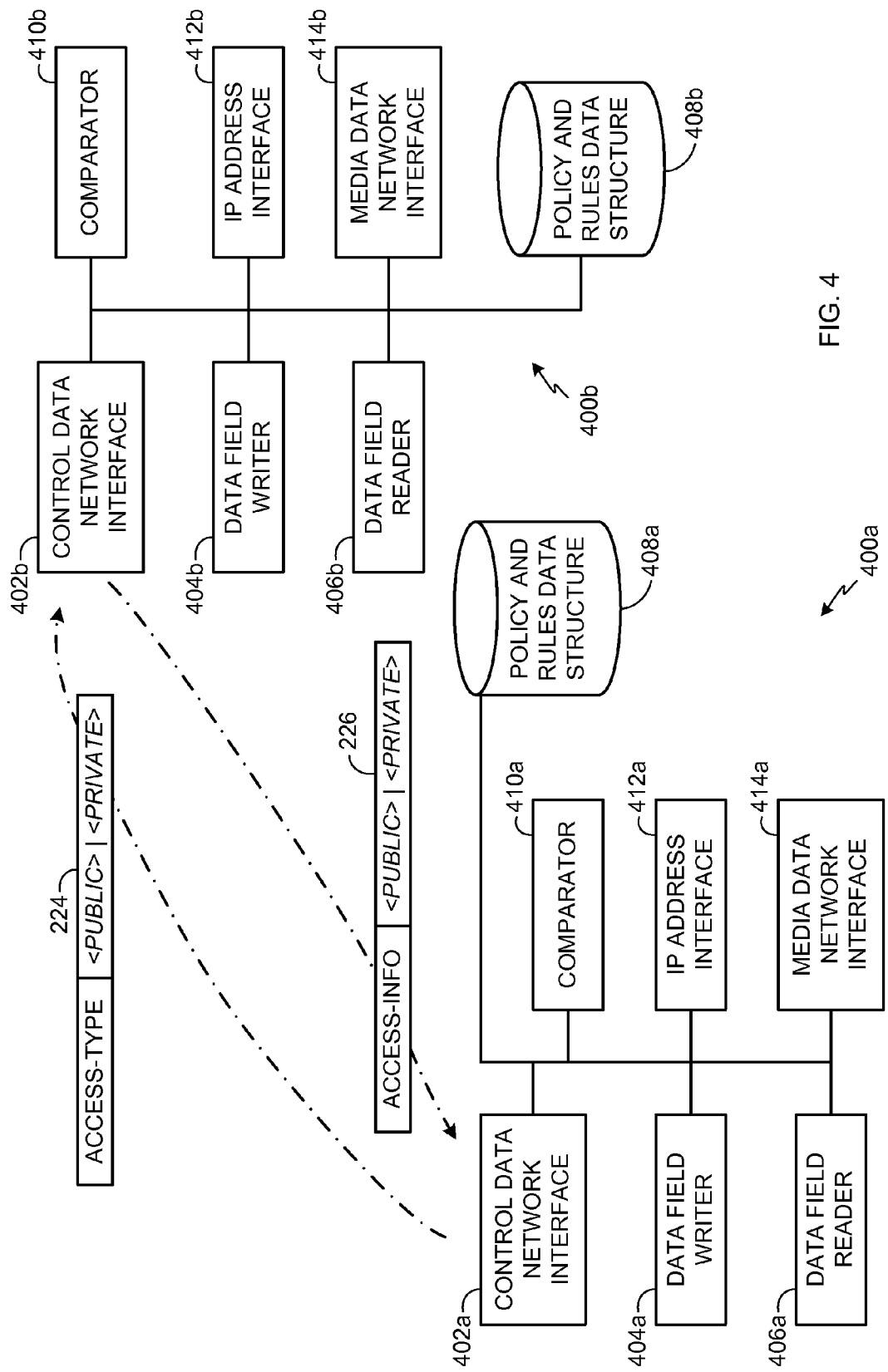
FIG. 4 is a block diagram of example systems that may be used to implement the example session border controllers of FIGS. 2 and 3.

FIG. 4 is a block diagram of example systems 400a and 400b that may be used to implement the example S/BC's 212, 214, and/or 300 of FIGS. 2 and/or 3. The example systems 400a and 400b include respective ones of control data network interfaces 402a and 402b, data field writers 404a and 404b, data field readers 406a and 406b, policy and rules data structures 408a and 408b, comparators 410a and 410b, IP address interfaces 412a and 412b, and media data network interfaces 414a and 414b, all of which may be implemented using any desired combination of hardware, firmware, and/or software. For example, one or more integrated circuits, discrete semiconductor components, or passive electronic components may be used. Additionally or alternatively, some or all of the blocks of the example systems 400a and 400b, or parts thereof, may be implemented using instructions, code, and/or other software and/or firmware, etc. stored on a machine accessible medium that, when executed by, for example, a processor system (e.g., the example processor system 610 of FIG. 6), perform the operations represented in the flow diagrams of FIGS. 5A and 5B.

In the illustrated example, the blocks of the example systems 400a and 400b can be located in respective network devices. For example, the blocks of the example system 400a can be housed within a single device housing and the blocks of the example system 400b can be housed within another device housing. Alternatively, the blocks of the example system 400a and 400b can be distributed among various network devices in the example network system 200 of FIG. 2. The below discussion describes the blocks of the example systems 400a and/or 400b as being implemented using the blocks of the example S/BC 300 of FIG. 3. However, in alternative example implementations, the blocks of the example systems 400a and 400b may be implemented using different blocks, a combination of blocks, or none of the blocks described above in connection with the example SBC 300.

In the illustrated example, the control data network interface 402a, the data field writer 404a, the data field reader 406a, the policy and rules data structure 408a, the comparator 410a, the IP address interface 412a, and the media data network interface 414a are substantially similar or identical to respective ones of the control data network interface 402b, the data field writer 404b, the data field reader 406b, the policy and rules data structure 408b, the comparator 410b, the IP address interface 412b, and the media data network interface 414b. Therefore, although the discussion below will describe in detail the blocks of the example system 400a, the description of corresponding blocks of the example system 400b are substantially similar or identical and, thus, in the interest of brevity, duplicated blocks will not be discussed. Instead, the interested reader is referred to the description of the like numbered parts in the example system 400a for a complete description of the corresponding structures in the example system 400b.

Turning in detail to the example system 400a, to receive and transmit the control data 220 of FIG. 2, the example system 400a includes the control data network interface 402a. In the illustrated example, the control data interface 402a is configured to be communicatively coupled with source devices (e.g., the source 208 of FIG. 2) and with other control data interfaces (e.g., the control data interface 402b). In some example implementations, the control data interface 402a may be implemented using, for example, the call session controller 302 of FIG. 3.

To write control data (e.g., the control data 220 of FIG. 2), the example system 400a is provided with the data field writer 404a. To read control data, the example system 400a is provided with a data field reader 406a. In the illustrated example, the data field writer 404a is configured to write data to and the data field reader 406a is configured to read data from the access-type field 224 and the access-info field 226 of the P-Access-Network-Info header 222 of FIG. 2. In some example implementations, the data field writer 404a and the data field reader 406a can be implemented using the call session controller 302 of FIG. 3.

To store policy and rules associated with the management and allocation of resources of the example system 400a, the example system 400a is provided with a policy and rules data structure 408a. In the illustrated example, the policy and rules data structure 408a stores policies and rules associated with the manner in which the example system 400a is configured to communicate data (e.g., the media data 202 of FIG. 2) and/or allow data to be communicated therethrough. An example policy indicates whether the example system 400a has access to a public network (e.g., the public network A 204 of FIG. 2) and whether it is able to communicate data via the public network. The policies and rules may be based on technical features, capabilities, and/or limitations of the example system 400a. Additionally or alternatively, the policies and rules may be based on preferences of a network operator or service provider that owns and operates the example system 400a. In some example implementations, the policy and rules data structure 408a can be implemented using the policy server 304 of FIG. 3.

To compare values, the example system 400a is provided with a comparator 410a. In the illustrated example, the comparator 410a is configured to compare the public and private descriptor values stored in the access-type field 224 and the access-info field 226 of the P-Access-Network-Info header 222 of FIG. 2. In some example implementations, the comparator 410a can be implemented using the call session controller 302 of FIG. 3.

To provide public and/or private IP addresses associated with the example system 400a, the example system 400a is provided with an IP address interface 410a. In the illustrated example, the IP address interface 410a is configured to provide a public IP address to a requesting network entity (e.g., an S/BC, a source device, etc.) if the example system 400a has access to a public network (e.g., the public network A 204 of FIG. 2) and is able to communicate via the public network. Also, the IP address interface 410a is configured to provide a private IP address to a network entity (e.g., an S/BC, a source device, etc.) requesting to communicate via a private communication path.

To receive and transmit the media data 202 of FIG. 2, the example system 400a includes the media data network interface 414a. In the illustrated example, the media data interface 414a is configured to be communicatively coupled with source devices (e.g., the source 208 of FIG. 2) and with other media data interfaces (e.g., the media data interface 414b). In some example implementations, the media data interface 414a may be implemented using, for example, the border gateway 306 of FIG. 3.

Figure 5A:
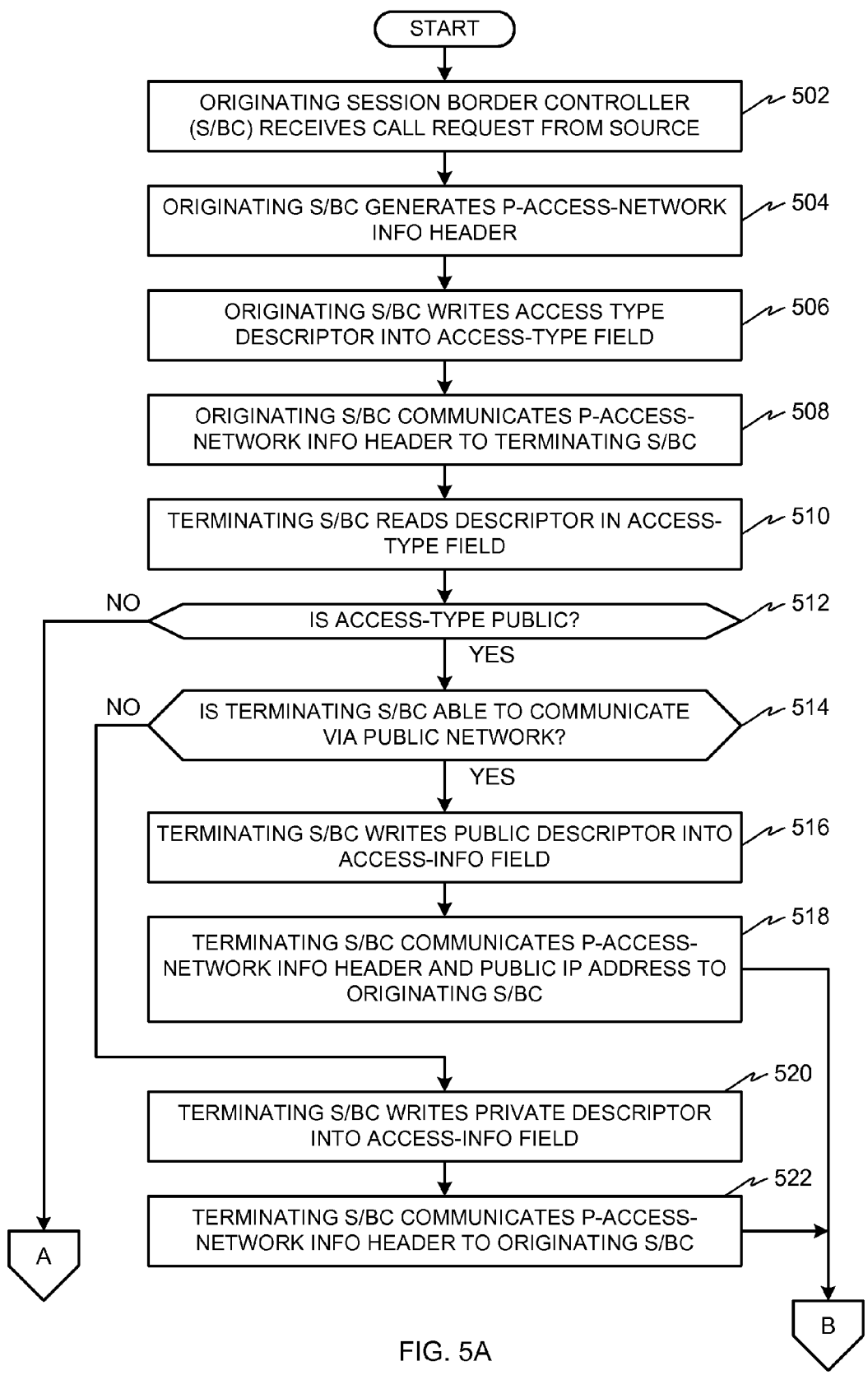
FIGS. 5A and 5B depict a flowchart representative of example machine readable instructions that may be executed to release media across different networks using the example systems of FIG. 4.
Figure 5B:
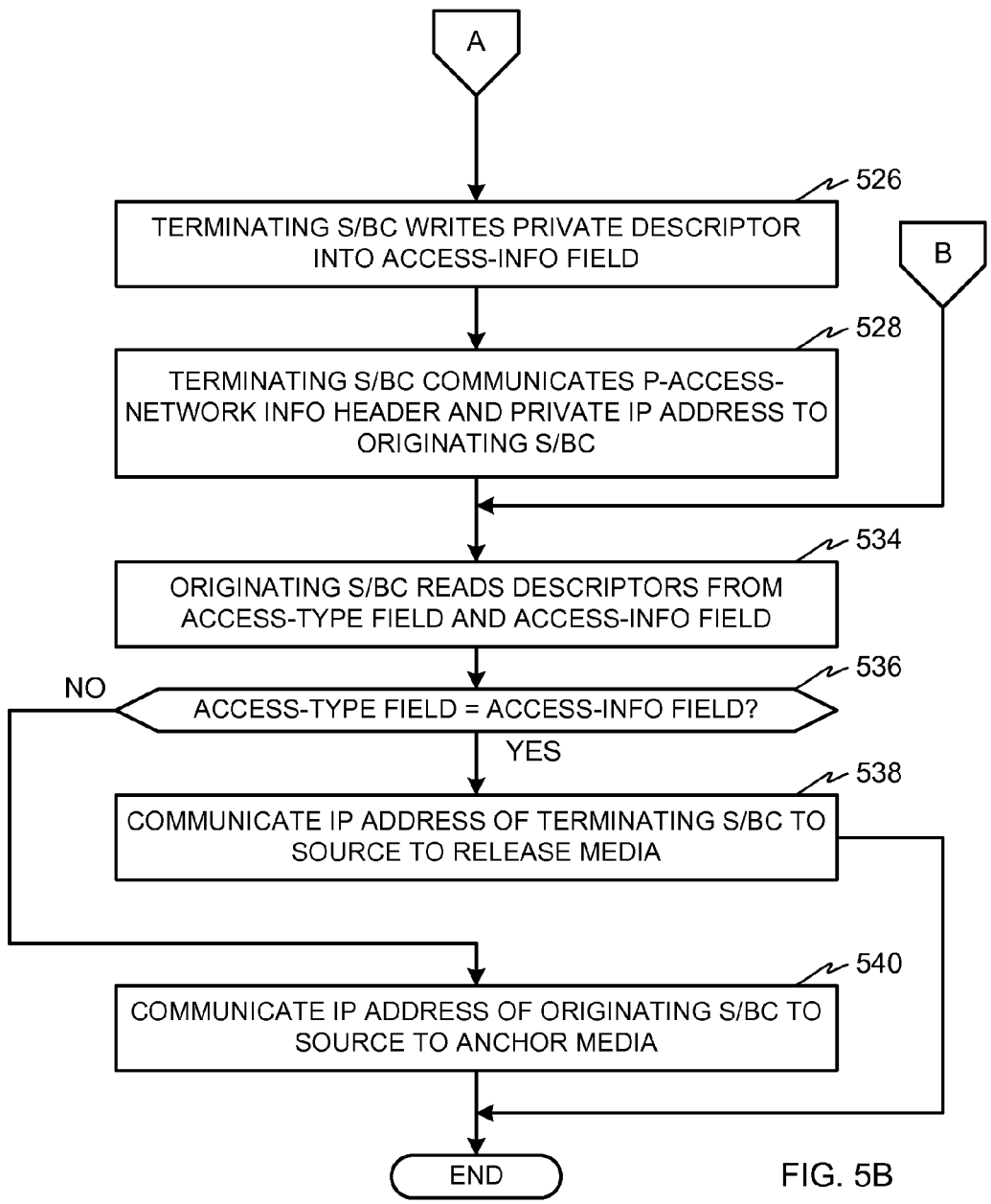

FIGS. 5A and 5B illustrate a flowchart representative of example machine readable instructions that may be executed to release media across different networks using the example systems 400a and 400b of FIG. 4. In the discussion below, the originating S/BC 212 of FIG. 2 is described as being implemented using the example system 400a and the terminating S/BC 214 of FIG. 2 is described as being implemented using the example system 400b. Although the example machine readable instructions are described with reference to the flowchart of FIGS. 5A and 5B, persons of ordinary skill in the art will readily appreciate that other methods of releasing media across different networks and implementing the example systems 400a and 400b of FIG. 4 may additionally or alternatively be used. For example, the order of execution of the blocks depicted in the flowchart of FIGS. 5A and 5B may be changed, and/or some of the blocks described may be rearranged, eliminated, or combined.

Turning in detail to FIG. 5A, initially, the control data network interface 402a of the originating S/BC 212 receives a VoIP call request from the source 208 (block 502). For example, the source 208 may request a public communication path or a private communication path. The originating S/BC 212 then generates the P-Access-Network-Info header 222 of FIG. 2 (block 504), and the data field writer 404a of the originating S/BC 212 writes an access type descriptor into the access-type field 224 (block 506). For example, if the call request received at block 502 requests a public communication path, the data field writer 404a writes a public descriptor in the access-type field 224. Otherwise, if the call request indicates a private communication path request, the data field writer 404b writes a private descriptor in the access-type field 224. The control data network interface 402a then communicates the P-Access-Network-Info header 222 to the control data network interface 402b of the terminating S/BC 214 (block 508) via, for example, a data packet.

When the terminating S/BC 214 receives the P-Access-Network-Info header 222, the data field reader 406b reads the descriptor in the access-type field 224 (block 510). The comparator 410b of the terminating S/BC 214 then determines whether the access-type descriptor is public (block 512) by, for example, comparing the descriptor obtained at block 510 to a public descriptor value. If the comparator 410b determines that the access-type descriptor is public (block 512), the terminating S/BC 214 determines whether it is able to communicate via a public network (e.g., the public network A 204 of FIG. 2) (block 514) by, for example, checking the policies and/or rules stored in the policy and rules data structure 408b.

If the terminating S/BC 214 determines that it is able to communicate via a public network (block 514), the data field writer 404b of the terminating S/BC 214 writes a public descriptor in the access-info field 226 of the P-Access-Network-Info header 222 (block 516). The control data network interface 402b then communicates the P-Access-Network-Info header 222 and a public IP address associated with the terminating S/BC 214 to the originating S/BC 212 (block 518) via, for example, a data packet. For example, the control data network interface 402b can obtain a public IP address from the IP address interface 412b that was allocated by a network administrator to the terminating S/BC 214 for use by the terminating S/BC 214 to communicate (e.g., receive and transmit) data via a public network such as, for example, the public network A 204 of FIG. 2.

If at block 514, the terminating S/BC 214 determines that it is not able to communicate via a public network, the data field writer 404b writes a private descriptor in the access-info field 226 (block 520), and the control data network 402b communicates the P-Access-Network-Info header 222 to the originating S/BC 212 (block 522) via, for example, a data packet. At block 522, the control data network 402b does not communicate a public IP address because, when control is passed to block 522, the terminating S/BC 214 is not configured to access a public network and, thus, does not have any public IP addresses allocated to it for use in communicating via the public network.

If at block 512, the comparator 410b determines that the access-type descriptor is not public (i.e., it is private), the data field writer 404b of the terminating S/BC 214 writes a private descriptor in the access-info field 226 of the P-Access-Network-Info header 222 (block 526). The control data network interface 402b then communicates the P-Access-Network-Info header 222 and a private IP address associated with the terminating S/BC 214 to the originating S/BC 212 (block 528) via, for example, a data packet. For example, the control data network interface 402b can obtain a private IP address from the IP address interface 412b that was allocated by a network administrator to the terminating S/BC 214 for use by the terminating S/BC 214 to communicate (e.g., receive and transmit) data via a private communication path (e.g., the private network 216 of FIG. 2).

After block 528, block 522, or block 518, when the originating S/BC 212 receives the P-Access-Network-Info header 222, the data field reader 406a reads the descriptors from the access-type field 224 and the access-info field 226 (block 534). The comparator 410a then compares the descriptors to determine whether the descriptor from the access-type field 224 matches the descriptor from the access-info field 226 (block 536). If the comparator 410a determines that the descriptors match (block 536), the control data network interface 402a communicates the IP address received from the terminating S/BC 214 to the source 208 to release the media data 202 (block 538). In this manner, the source 208 can use the public IP address or the private IP address of the terminating S/BC 214 to bypass the originating S/BC 212 and communicate the media data 202 directly to the terminating S/BC 214.

If the comparator 410a determines that the descriptors of the access-type field 224 and the access-info field 226 do not match (block 536), the control data network interface 402a communicates an IP address of the originating S/BC 212 to the source 208 to anchor the media data 202 (block 540). The originating S/BC 212 then anchors the media data 202 so that the source 208 communicates the media data 202 to the terminating S/BC 214 via the originating S/BC 212. After the originating S/BC 212 releases the media data 202 (block 538) or after the originating S/BC 214 anchors the media data 202 (block 540), the process of FIGS. 5A and 5B ends.

In some example implementations, instead of communicating the IP address of the originating S/BC 212 to the source 208 at block 540, the control data network interface 402a may be configured to communicate the P-Access-Network-Info header 222 to another terminating S/BC (not shown) to try and release the media data 202. In such a case, the originating S/BC 212 and the other terminating S/BC perform operations substantially similar or identical to the operations discussed above in connection with the flowchart of FIGS. 5A and 5B. If the originating S/BC 212 determines that there are no terminating S/BC's to which it can release the media data 202, the control data network interface 402a of the originating S/BC 212 communicates an IP address of the originating S/BC 212 to the source 208 to anchor the media data 202 as described above in connection with block 540. Otherwise, if the originating S/BC 212 finds a terminating S/BC to which it can release the media data 202, the control data network interface 402a communicates the IP address received from that terminating S/BC to the source 208 to release the media data 202 as described above in connection with block 538.

Figure 6:
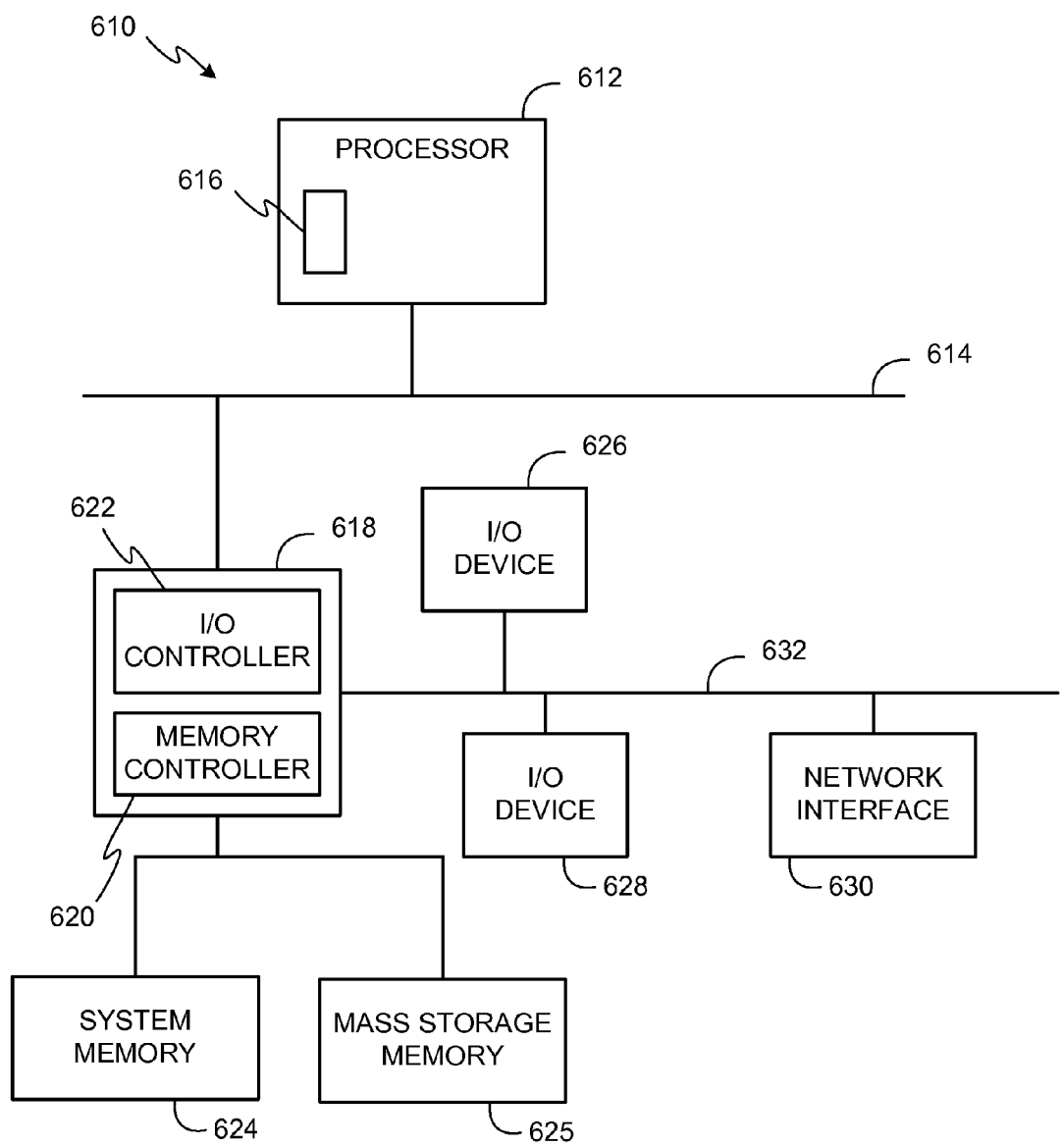
FIG. 6 is a block diagram of an example processor system that may be used to execute the example machine readable instructions of FIGS. 5A and 5B to implement the example systems of FIG. 4.

FIG. 6 is a block diagram of an example processor system 610 that may be used to implement the example methods, systems, and articles of manufacture described herein. For example, processor systems substantially similar or identical to the example processor system 610 may be used to implement the S/BC's 212 and 214 of FIG. 2 and/or the S/BC 300 of FIG. 3. In addition, processor systems substantially similar or identical to the example processor system 610 may be used to implement the control data network interfaces 402a and 402b, the data field writers 404a and 404b, the data field readers 406a and 406b, the policy and rules data structures 408a and 408b, the comparators 410a and 410b, the IP address interfaces 412a and 412b, and the media data network interfaces 414a and 414b of the example systems 400a and 400b of FIG. 4.

As shown in FIG. 6, the processor system 610 includes a processor 612 that is coupled to an interconnection bus 614. The processor 612 includes a register set or register space 616, which is depicted in FIG. 6 as being entirely on-chip, but which could alternatively be located entirely or partially off-chip and directly coupled to the processor 612 via dedicated electrical connections and/or via the interconnection bus 614. The processor 612 may be any suitable processor, processing unit or microprocessor. Although not shown in FIG. 6, the system 610 may be a multi-processor system and, thus, may include one or more additional processors that are identical or similar to the processor 612 and that are communicatively coupled to the interconnection bus 614.

The processor 612 of FIG. 6 is coupled to a chipset 618, which includes a memory controller 620 and an input/output (I/O) controller 622. A chipset provides I/O and memory management functions as well as a plurality of general purpose and/or special purpose registers, timers, etc. that are accessible or used by one or more processors coupled to the chipset 618. The memory controller 620 performs functions that enable the processor 612 (or processors if there are multiple processors) to access a system memory 624 and a mass storage memory 625.

The system memory 624 may include any desired type of volatile and/or non-volatile memory such as, for example, static random access memory (SRAM), dynamic random access memory (DRAM), flash memory, read-only memory (ROM), etc. The mass storage memory 625 may include any desired type of mass storage device including hard disk drives, optical drives, tape storage devices, etc.

The I/O controller 622 performs functions that enable the processor 612 to communicate with peripheral input/output (I/O) devices 626 and 628 and a network interface 630 via an I/O bus 632. The I/O devices 626 and 628 may be any desired type of I/O device such as, for example, a keyboard, a video display or monitor, a mouse, etc. The network interface 630 may be, for example, an Ethernet device, an asynchronous transfer mode (ATM) device, an 802.11 device, a digital subscriber line (DSL) modem, a cable modem, a cellular modem, etc. that enables the processor system 610 to communicate with another processor system.

While the memory controller 620 and the I/O controller 622 are depicted in FIG. 6 as separate functional blocks within the chipset 618, the functions performed by these blocks may be integrated within a single semiconductor circuit or may be implemented using two or more separate integrated circuits.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above-described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by different, faster, and/or more efficient systems having the same general purpose. Accordingly, replacement devices, standards and/or protocols having the same general functions are equivalents which are intended to be included within the scope of the accompanying claims.

Further, although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A tangible machine readable storage device comprising instructions which, when executed, cause a first network device in a first network to perform a operations comprising:
    storing, a first descriptor in a first private session initiation protocol header field of a first data packet;
    communicating the first data packet to a second network device in a second network;
    comparing the first descriptor to a second descriptor from a second data packet from the second network device, the second descriptor in a second private session initiation protocol header field; and
    when the first descriptor matches the second descriptor and the second network device has access to a public network, communicating an internet protocol address of the second network device to a communication source to cause the communication source to bypass the first network device and a private network, and communicating data to the second network device via the public network.

2. A machine readable storage device as defined in claim 1, wherein the communication source communicates directly with the second network device when the first network device is bypassed.

3. A machine readable storage device as defined in claim 1, wherein the first network device comprises a first session border controller of the first network and the second network device comprises a second session border controller of the second network.

4. A machine readable storage device as defined in claim 1, wherein the data is associated with a voice over internet protocol communication.

5. A machine readable storage device as defined in claim 1 further comprising instructions that, when executed, cause the first network device to store the first descriptor in a field associated with an Internet Engineering Task Force Request for Comments 3455 private header.

6. A machine readable storage device as defined in claim 1 further comprising instructions that, when executed, cause the first network device to store the first descriptor with the first private session initiation protocol header in an access-type field of a first header in the first data packet, and to read the second descriptor from an access-info field of a second header in the second data packet.

7. A method to communicate information between different networks, comprising:
    determining, with a processor, whether a second network device in a second network has a communication capability associated with a first descriptor in a first private session initiation protocol header field of a first data packet from a first network device in a first network based on a comparison of
    the first descriptor and a second descriptor in a second private session initiation protocol header field of a second data packet, the second descriptor indicative of whether the second network device has the communication capability with the first network device; and
    when the second network device has the communication capability based on a match between the first descriptor and the second descriptor, receiving, via the second network device, data from a communication source that bypasses the first network device and communicates the data to the second network device.

8. A method as defined in claim 7, wherein the first network device comprises a first session border controller of the first network and the second network device comprises a second session border controller of the second network.

9. A method as defined in claim 7, wherein the data from the communication source is associated with a voice over internet protocol communication.

10. A method as defined in claim 7, wherein the communication source communicates directly with the second network device via a public network when the first network device is bypassed.

11. A method as defined in claim 7, further comprising storing the first descriptor in a field associated with an Internet Engineering Task Force Request for Comments 3455 private header.

12. A method as defined in claim 7, further comprising storing the first descriptor in an access-type field of a first header in the first data packet, wherein the second descriptor is stored in an access-info field of a second header in the second data packet.

13. An apparatus comprising:
    a data field reader to identify a first data packet having a first descriptor in a first private session initiation protocol header field of the first data packet from a first network device in a first network, and to determine whether a second network device in a second network has a matching capability associated with the first descriptor;
    a data field writer to store a second descriptor in a second private session initiation protocol header field of a second data packet, the second descriptor indicative of whether the second network device has the matching capability; and
    a media data network interface to communicate the second descriptor to the first network device via the second data packet, and when the second network device has the capability based on a match between the first descriptor and the second descriptor, to receive data from a communication source that bypasses the first network device and communicates the data to the second network device.

14. An apparatus as described in claim 13, wherein the first network device comprises a first session border controller of the first network and the second network device comprises a second session border controller of the second network.

15. An apparatus as described in claim 13, further comprising a call session controller to associate the data with a voice over internet protocol communication.

16. An apparatus as described in claim 13, wherein the communication source is to communicate directly with the second network device via a public network when the first network device is bypassed.

17. An apparatus as described in claim 13, further comprising a policy server to store the first descriptor in a field associated with an Internet Engineering Task Force Request for Comments 3455 private header.

18. An apparatus as described in claim 13, wherein the data field writer is to store the first descriptor in an access-type field of a first header in the first data packet, and to store the second descriptor in an access-info field of a second header in the second data packet.

19. An apparatus as described in claim 13, further comprising a comparator to determine whether the matching capability is at least one of access to a public network, or access to a private network.

* * * * *